United States Patent [19]
DeLuca, Jr.

[11] Patent Number: 5,433,779
[45] Date of Patent: Jul. 18, 1995

[54] RUTILE TITANIUM DIOXIDE COATED MICACEOUS PIGMENTS FORMED WITHOUT TIN

[75] Inventor: Carmine V. DeLuca, Jr., Peekskill, N.Y.

[73] Assignee: The Mearl Corporation, Ossining, N.Y.

[21] Appl. No.: 336,085

[22] Filed: Nov. 7, 1994

Related U.S. Application Data

[63] Continuation-in-part of Ser. No. 162,654, Dec. 6, 1993, abandoned.

[51] Int. Cl.$^6$ ................................................ C09C 3/06
[52] U.S. Cl. ..................... 106/418; 106/415; 106/417; 106/449; 106/461
[58] Field of Search ............... 106/418, 449, 461, 415, 106/417

[56] References Cited

U.S. PATENT DOCUMENTS 4,086,100  4/1978  Esselborn et al. .................. 106/291

FOREIGN PATENT DOCUMENTS 1359933  7/1974  United Kingdom .

OTHER PUBLICATIONS

J. Oil Col. Chem. Assoc. 1967, 50, 495–507, V. Blechta et al., "The influence of additive and calcination on the pigment properties of titanium dioxide: Part III. The influence of some rutilisation catalysts."

Primary Examiner—Mark L. Bell
Assistant Examiner—Scott L. Hertzog
Attorney, Agent, or Firm—Ostrolenk, Faber, Gerb & Soffen

[57] ABSTRACT

A pearlescent pigment comprising micaceous particles having an adherent layer of rutile titanium dioxide thereon is prepared by effecting the deposition of hydrous titanium dioxide on the micaceous particles in the presence of iron and calcium, magnesium and/or zinc ions without the use of tin.

18 Claims, No Drawings

RUTILE TITANIUM DIOXIDE COATED MICACEOUS PIGMENTS FORMED WITHOUT TIN

This is a continuation-in-part of application Ser. No.08/162,654, filed Dec. 6, 1993, now abandoned.

BACKGROUND OF THE INVENTION

Nacreous or pearlescent pigments which are titanium dioxide coatings on mica substrates are well known. The pigments exhibit pearl-like and/or iridescent effects from their reflection and transmission of light. The titanium dioxide coating is actually transparent to light. However, because the coatings are extremely smooth and have a high index of refraction, they follow the laws of thin films. Part of the light which strikes each platelet is reflected and part transmitted to lower platelets where multiple reflections can occur. These multiple reflections from lower layers give a sense of depth or sheen which simulates the real pearl. Also, if the thickness of the titanium dioxide layer is controlled, interference of light occurs and the platelets act as optical filters separating light into two components. A color is seen by reflection and a complementary color by transmission.

Pearlescent pigments are used extensively in a variety of applications including plastic incorporation, automotive coatings and in cosmetics. The pearlescent pigments which are titanium dioxide coated on a mica substrate have a high index of refraction. The pigments are normally dispersed in mediums such as paint films, or nail enamel films which, when fully cured, have an index of refraction of about 1.5. The index of refraction of the pearlescent pigment must therefore be considerably higher than 1.5 if reflectivity of light is to occur. This high index of refraction is provided by the titanium dioxide layer whose index can vary between 2.3 and 2.5. The mica substrate on which the titanium dioxide is coated has an index about 1.5 and therefore, does not take part in any reflectivity when incorporated in a film. The rutile form of titanium dioxide has a higher index than the anatase form and as a result, the rutile modification will have greater reflectivity than the anatase form. Therefore, the rutile modification of titanium dioxide in a pearlescent pigment is more desirable than the anatase modification.

There are many other reasons for preferring the rutile modification. The rutile modification is more stable in outdoor weathering than is the anatase modification. The rutile modification of a titanium dioxide coated mica results in a product which has better luster and reflectivity, better color and color homogeneity and also contains fewer small particles. In the processing stage during the formation of the titanium dioxide on the mica, particles which are not attached to the mica may form. These small particles, which resemble pigmentary $TiO_2$, cause light scattering. If too many small particles are present, the pearlescent appearance may be lost or diminished. The process for coating mica in the rutile crystalline form results in very few small particles compared to the anatase form.

If mica is coated with a layer of hydrous titanium dioxide and then subjected to the normal processing methods which include washing drying and calcining usually from 750° C. to 900° C. the titanium dioxide which is formed is in the anatase form. The presence of the mica causes the $TiO_2$ to orient in the anatase crystalline form. Such pigments have been described for example in Quinn et al. U.S. Pat. No. 3,437,515 issued Apr. 8, 1969 and Rieger et al U.S. Pat. No. 3,418,146 issued Dec. 24, 1968 and Linton U.S. Pat. No. 3,087,828.

If a rutile crystalline form is desired, a layer of hydrous tin oxide is first precipitated on the surface of the mica followed by a layer of hydrous titanium dioxide. When this layered combination is processed and calcined, the titanium dioxide is oriented in the rutile form. This is described in detail in U.S. Pat. Nos. 4,038,099 and also 4,086,100. Other methods of forming rutile $TiO_2$ on mica substrates using tin oxide are also described.

Although many additives can aid in the formation of rutile $TiO_2$ per se, the formation of rutile $TiO_2$ on mica requires a very special additive. The coating of $TiO_2$ on the mica must be smooth and uniform. If an irregular surface is formed, light scattering takes place and the pigment no longer functions as a pearlescent pigment. The coating of $TiO_2$ must also adhere strongly to the mica or else the coating of $TiO_2$ will be separated from the mica during processing, resulting in considerable breakage and loss of luster. It is also necessary that the luster, color, and color homogeneity be maintained. Small particle formation must be suppressed. Otherwise, the small particles will scatter light and diminish the pearlescent luster as was mentioned previously. An additive which is used must therefore perform many functions besides being a rutile crystalline director. It has been difficult to find an additive (other than tin) which can orient the $TiO_2$ to the rutile modification while still maintaining quality and all of the other desirable characteristics.

Presently, additives other than tin for forming the rutile modification of titanium dioxide on mica while still maintaining all other desirable characteristics do not exist. The use of tin oxide is the method of choice and is used universally in all commercial rutile titanium dioxide coated micas.

There are, however, two major disadvantages to the use of tin to make rutile $TiO_2$ coated mica. The first is that tin oxide is not permitted in polymer compositions which are to be used in contact with food. Thus, any high quality pearlescent or interference pigment which contains tin oxide cannot be used to color the polymer film. The second is that in some countries, notably Japan, the presence of tin oxide is not permitted in cosmetic products. Cosmetic manufacturers are therefore faced with a choice of either formulating cosmetic products destined for Japan with anatase only products and having a second line of the same products for the rest of the world formulated with rutile products or having a single anatase product line for the entire world. The result is that polymer formulations in contact with food and cosmetic lines to be used worldwide use anatase products even though the rutile $TiO_2$-coated products have better color, color homogeneity and luster.

It is therefore the object of this invention to provide a pearlescent pigment of titanium dioxide coated mica in which the titanium dioxide is in the rutile crystalline form and in which tin has not been used to promote rutilization. A further object of this invention is to provide a rutile $TiO_2$-coated mica which has the same advantages and characteristics of the tin containing product which includes luster, color, color homogeneity and few small particle formation during manufacture. These and other objects of the invention will become apparent to one of ordinary skill in this art from the following detailed description.

SUMMARY OF THE INVENTION

This invention relates to high quality $TiO_2$-coated micaceous pearlescent pigments. If a small concentration of Fe and one or more of Zn, Ca and Mg ions are introduced into the coating prior to the start of the precipitation of hydrous titanium dioxide on mica, the precipitation proceeds as if a layer of hydrous tin oxide had been added. Complete rutile formation is achieved. Both the pearl color and also the interference colors are formed that have the same quality and characteristics as the tin oxide-containing counterparts.

DESCRIPTION OF THE INVENTION

In accordance with the present invention, high quality $TiO_2$-coated micaceous pearlescent pigments are formed in which the $TiO_2$ is in the rutile form as a result of the use of iron with zinc, calcium and/or magnesium in the absence of tin.

It was found that the presence of Fe is as effective as the Sn treatment in causing the $TiO_2$ coating to be in the rutile crystalline form. The presence of Zn, Ca or Mg in most cases actually represses the formation of rutile $TiO_2$. The function of the zinc, calcium and magnesium therefore is to aid in the development of the critical and other essential features necessary for formation of pearlescent pigments. The combination of ions are necessary for the formation of a high quality rutile $TiO_2$-coated mica similar in every respect to the tin-containing pigment. The iron is used as a rutile modifier and the zinc, calcium or magnesium is used as a growth modifier. Together, they form a high quality rutile $TiO_2$-coated mica which does not contain added tin.

If a large concentration of iron is added, complete rutilization of the $TiO_2$ layer can be achieved. However, the resulting pigment acquires a tan or iron color which is objectionable in many applications especially at the white reflecting pearl color. The concentration of Fe ions must therefore be reduced so that only a trace of the tan color is found and is no longer objectionable. If this is done, however, it is found that the other desirable characteristics of the pigment suffer. Luster, color and small particle formation become unacceptable and the product no longer resembles the product made with tin.

It was found that if a small quantity of Zn, Ca and/or Mg ions are added to the coating bath together with the small quantity of Fe ions, complete rutilization can be achieved and quality and the other desirable characteristics can be maintained. The tan color imparted by Fe is no longer objectionable and the product in all respects resembles the product made with tin.

The presence of iron, zinc, etc. in titanium dioxide and titanium dioxide-coated mica has been noted in the literature. Thus, Linton in U.S. Pat. No. 3,087,828 teaches that light sensitivity of the titanium dioxide coated on mica can be improved by employing an additional metal oxide which is either deposited on or intermingled with the titanium dioxide. One metal oxide mentioned is iron oxide. Linton does not indicate that iron is rutile directing. The Linton patent also states, with respect to zinc, that "when a combined layer of hydrous $TiO_2$ and ZnO is calcined, the resulting layer exhibits the X-ray pattern of rutile $TiO_2$ whereas the single layers of $TiO_2$ show anatase $TiO_2$".

Other patents and papers are concerned only with the formation of pigmentary $TiO_2$ and not $TiO_2$ coated on mica. Thus, Hoffman et al. in U.S. Pat. No. 3,453,129 speaks of a rutile titanium dioxide-calcium sulfate composite pigment. This is made by heating a $TiOSO_4$—$FeSO_4$ solution with an aqueous slurry of $CaSO_4$ anhydrate. Before calcining, 0.2–2% ZnO is added and the mixture calcined at 800°–1000° C. The calcined product is ground to produce a rutile $TiO_2$—$CaSO_4$ composite pigment. Also in the paper "Kinetics and Mechanism of the Anatase/Rutile Transformation, as Catalyzed by Ferric Oxide and Reducing Conditions", Emerson F. Heald and Clair W. Weiss, *American Mineralogist*, Vol., 57, pp. 10–23 (1972), it was noted that traces of ferric oxide have a strong catalytic effect on both nucleation and growth phases of the transformation of $TiO_2$ from anatase to rutile.

In most reported cases, the primary concern is the formation of the rutile structure since coatings are not made on mica. Other considerations which are of primary importance in the formation of high quality micaceous pearlescent pigments which include the maintenance of extremely smooth surfaces, uniformity of thickness and color homogeneity are not pertinent. There is no indication in these papers nor in the literature that an extremely small concentration of both ions of Fe and of Zn, Ca and/or Mg would accomplish all objectives.

A pearlescent pigment which comprises particles having an adherent layer of rutile titanium dioxide and which does not contain tin as a rutile promoter is achieved by precipitating the hydrous titanium dioxide on the mica in the presence of both iron and zinc, calcium and/or magnesium ions. The procedure is generally the same as that employed to form tin-containing rutile $TiO_2$-coated mica with the exception that no tin is employed and the iron and zinc, calcium and/or magnesium ions are substituted for the tin.

In the coating process mica is dispersed in water, which is preferably distilled. Although muscovite mica is the preferred mica because of its white color, other micas can be used which include phlogopite, lipidolite or synthetic micas.

The average particle size of the mica which is used can vary from an average particle size of about 3 microns to an average particle size of about 100 microns. The concentrations of mica in the water can vary from about 5% to 25%. The generally preferred concentration varies between about 10% to 20%.

After the mica is dispersed in the water and placed in an appropriate vessel, both Fe and one or more of Zn, Ca and Mg ions are introduced. The Fe ions are introduced as chloride ions but other forms can be used such as nitrates or sulfates etc. The zinc, calcium and/or magnesium ions are also preferably introduced as chlorides, but other forms can also be used which include sulfates and acetates.

The quantity of iron which is employed is important. There is a minimum below which the quality of the product deteriorates as evidenced by a decrease in luster even though complete rutile formation is achieved. The minimum amount can vary depending on the mica fraction used, the interference color to be made and the luster whiteness which is desired. The Fe content can vary between about 0.125% Fe to about 1.0% Fe based on the weight of mica. Most preferably, the amount of iron is about 0.25% to 0.75% based on the weight of mica A white pearl reflecting $TiO_2$ coated mica can tolerate only a very small concentration of Fe before the tan color in the product is observable. Interference colors, on the other hand, can tolerate larger concentrations of Fe. In fact, higher concentrations of Fe in interference pigments enhance the reflection color.

The amount of zinc, calcium and/or magnesium employed can also vary over a larger range since it has been found that regardless of the amount employed, only a small amount is incorporated in the product. Generally the amount is at least about 0.05% and preferably is about 0.25 to 0.75%

It is most convenient to treat the micaceous particles by adding the ions of iron followed by zinc, calcium and/or magnesium ions to the coating bath. They could also be added simultaneously. The pH is then adjusted to about 3.0 and heated to a temperature of 75° C. When that temperature is reached, the pH is then lowered to 1.6 by addition of a 1.1 HCl:water solution. Other methods for the addition of the iron and zinc, calcium and/or magnesium ions are possible. For example, it is possible to precipitate the iron on the mica at constant pH 3.5 by slow addition of the iron salt. Zinc, calcium and/or magnesium ions are then added to the coating bath and the precipitation is continued by addition of the hydrous titanium dioxide. Alternately, both the iron and zinc, calcium and/or magnesium can be precipitated on the mica. The iron can be precipitated at constant pH 3.5 and the second metal at constant pH 5.8, followed by precipitation of the hydrous titanium dioxide at constant pH 1.6.

The pH at which the hydrous titanium dioxide is precipitated is important. Above about pH 1.9 complete rutilization will not occur. Below that value, it is dependent on the particular system although complete rutilization is formed at about pH 1.6 and a pH below about 1 should be avoided. Between pH 1.6 and pH 1.9, mixtures of anatase and rutile titanium dioxide usually form. Generally the pH should be at least about 1.4.

Other than the modifications noted above, the procedure to form the tin free, rutile titanium dioxide-coated micaceous pigment is conventional.

Various non-limiting examples are set forth below to further illustrate the present invention. In these, as well as throughout the balance of this specification and claims, all parts and percentages are by weight and all temperatures are in degrees Centigrade unless otherwise indicated.

EXAMPLES 1–25

A coating procedure was adopted in which 200 grams of muscovite mica having an average particle size of about 18 microns (by laser light scattering) were dispersed in 1 liter of water. Iron and zinc when employed were introduced in the form of 7.5 grams of a 39% aqueous solution of ferric chloride further dissolved in 50 ml of distilled water and 2.1 grams of zinc chloride dissolved in 50 ml of water. In all procedures, the pH of the slurry was adjusted to 3.0 using a 35% aqueous sodium hydroxide solution and the slurry heated to a temperature of 75°. The pH was then lowered to 1.6 by addition of hydrochloric acid and a 40% aqueous solution of titanium tetrachloride was added at a rate of 100 ml/hour while the pH was maintained at 1.6 by the addition of 3.5% aqueous sodium hydroxide. The titanium introduction was continued until either a white pearl or interference colors which include gold, red, blue and green and also second and higher colors had been reached. When the desired end point was achieved, the slurry was filtered on a Buchner Funnel and washed with additional water. The coated platelets were then dried and calcined at 900° C.

The luster quality of the pigments produced in the foregoing fashion were determined by reflectance measurements made on standard drawdowns on a hiding power chart (Form 2-6 Opacity Charts of The Leneta Company), half of which is black and half of which is white. A coating on the black part of this chart displays the reflection color when it is examined by specular reflection while the coating on the white portion displays the transmission color when it is viewed at an angle which is not equal to the angle of incidence.

The standard drawdowns are prepared by suspending 3% pigment in a nitrocellulose lacquer which contains

| Nitrocellulose RS type 15–20 sec. | 2.9% |
| Nitrocellulose RS type 30–40 sec. | 6.6 |
| Isopropanol | 5.1 |
| Amylacetate | 44.8 |
| n-Butyl acetate | 37.6 |
| Mono-butoxydiethylene glycol | 3.0 |
| | 100.0% |

The two grades of nitrocellulose provide the desired combination of solids content and a viscosity of approximately 2000 centiposes at 25° C. The mono-butoxydiethylene glycol is used to prevent "blushing" or clouding of the lacquer film by condensation of water vapor from the atmosphere.

The drawdowns are made with a Bird film applicator which produces a wet film of approximately 0.003 inch (about 0.008 cm) thickness on the hiding power chart held firmly against a Bird vacuum plate. The spectrophotometric curve of the sample is determined with a Leres Trilac spectrophotometer using an angle of incidence of viewing of 15° to the normal. The reflectance is measured relative to a pressed cake of barium sulfate. Reflectance at the maximum ($R_{max}$) and the average reflectance are measurements of pearlescent or nacreous luster. The wavelength at the maximum is an indication of color, although the entire curve is required to describe the color completely.

Besides the luster measurements, the pigments were also analyzed for the percentage of rutile and anatase that was present in each sample by x-ray diffraction.

For comparison purposes, a number of different pigments were prepared at various thicknesses. One was made by the conventional Sn procedure. A second experiment was made with both Fe and Zn added. Other experiments included pigments which contained Fe but no Zn, Zn but no Fe, and a control which contained neither Sn, Fe, Zn. The results are shown in the following tables.

In all cases, except at the blue reflection, the Fe and Zn combinations produced products with quality equal to or exceeding the products which contained Sn. All the products were 100% rutile with no anatase present. It is also to be noted that with the exception of the white pearl, the presence of Zn actually repressed the formation of rutile. The presence of the Zn caused the quality of the pigment to equal that of the Sn.

From this data, the function of the Fe was to cause complete rutilization of the $TiO_2$ and the function of the Zn was to modify the growth so that equivalent quality to the Sn containing product was achieved.

TABLE I

White Pearl Reflecting TiO₂ Coated Mica

| Treatment | % Rutile | % Anatase | Rmax |
|---|---|---|---|
| Sn | 100 | 0 | 86.0 |
| Fe/Zn | 100 | 0 | 89.5 |
| Fe—No Zn | 100 | 0 | 82.5 |
| Zn—No Fe | 15 | 85 | 71.0 |
| No Fe, Zn or Sn | 10 | 90 | 68.5 |

TABLE II

Gold Interference Reflecting TiO₂ Coated Mica

| Treatment | % Rutile | % Anatase | Rmax |
|---|---|---|---|
| Sn | 100 | 0 | 68.5 |
| Fe/Zn | 100 | 0 | 71.0 |
| Fe—No Zn | 100 | 0 | 68.5 |
| Zn—No Fe | 25 | 75 | 57.0 |
| No Sn, Fe or Zn | 40 | 60 | 51.5 |

TABLE III

Red Interference Reflecting TiO₂ Coated Mica

| Treatment | % Rutile | % Anatase | R₄₀₀ |
|---|---|---|---|
| Sn | 100 | 0 | 60.0 |
| Fe/Zn | 100 | 0 | 60.5 |
| Fe—No Zn | 100 | 0 | 51.0 |
| Zn—No Fe | 22 | 78 | 26.0 |
| No Sn, Fe or Zn | 35 | 65 | 24.0 |

TABLE IV

Blue Interference Reflecting TiO₂ Coated Mica

| Treatment | % Rutile | % Anatase | Rmax |
|---|---|---|---|
| Sn | 100 | 0 | 63.0 |
| Fe/Zn | 100 | 0 | 59.0 |
| Fe—No Zn | 100 | 0 | 56.0 |
| Zn—No Fe | 33 | 67 | 31.0 |
| No Sn, Fe or Zn | 50 | 50 | 28.0 |

TABLE V

Green Interference Reflecting TiO₂ Coated Mica

| Treatment | % Rutile | % Anatase | Rmax |
|---|---|---|---|
| Sn | 100 | 0 | 56.5 |
| Fe/Zn | 100 | 0 | 57.0 |
| Fe alone | 100 | 0 | 55.0 |
| Zn alone | 100 | 0 | 31.5 |
| No Fe, Zn or Sn | 55 | 45 | 31.0 |

EXAMPLES 26–40

The combined iron and zinc procedure of the foregoing examples was repeated at three different concentrations of iron based on the mica. The results are set forth in the following table:

TABLE VI

Quality and Rutile Formation for Varying Iron Content

| Iron Content | % Rutile | Pearl Rmax | Gold Rmax | Red R₄₀₀ | Blue Rmax | Green Rmax |
|---|---|---|---|---|---|---|
| 0.5% | 100 | 88 | 71 | 60.5 | 59.0 | 57.0 |
| 0.25% | 100 | 84 | 69 | 62.5 | 64.0 | 63.0 |
| 0.125% | 99–100 | 70 | 62 | 45.0 | 50.0 | 50.0 |

The results indicate that the iron content can be reduced from 0.5% to 0.25% without a decrease in quality while still maintaining 100% rutile. When the iron content was decreased to 0.125%, however, the rutile content was no longer 100% and the quality of the products decreased. The iron content of 0.25% is the lower limit if quality and 100% rutile are to be maintained.

EXAMPLES 41–44

The combined iron/zinc procedure of Examples 1–25 is repeated at four different concentrations of zinc. They were 0.075, 0.1, 0.5 and 1.0% based on the weight of the mica. Analysis of the supernate indicates that essentially the same amount of zinc was incorporated into the pearlescent pigment and the balance of the zinc remained in solution.

EXAMPLES 45–49

Tin-free pearlescent pigments were prepared following the combined iron and zinc procedure of Examples 1–25, but substituting the corresponding sulfate and acetate salts for the zinc chloride there used.

EXAMPLES 50–55

The procedure of Examples 1–25 were repeated using 0.29% iron and either 0.5% Al, 0.7% Al, 0.5% Zr, 0.5% Ca, 0.5% Zn or 0.7% Mg to produce pearl or green reflecting products. The results are shown in the following Tables VII, VIII and IX:

TABLE VII

White Pearl Reflecting TiO₂ Coated Mica

| Treatment | % Rutile | % Anatase | Rmax | max |
|---|---|---|---|---|
| Fe/Zr | 83 | 17 | 62 | 420 |
| Fe/Al (0.5%) | 33 | 67 | 70 | 420 |
| Fe/Al (0.7%) | 65 | 35 | | 420 |
| Fe/Ca | 95 | 5 | 87 | 530 |
| Fe/Mg | 100 | 0 | 88 | 420 |
| Fe/Zn | 100 | 0 | 90 | 420 |

TABLE VIII

Green Interference Reflecting TiO₂ Coated Mica

| Treatment | % Rutile | % Anatase | Rmax | max |
|---|---|---|---|---|
| Fe/Zr | 97 | 3 | 50.5 | 500 |
| Fe/Al (0.7%) | 95 | 5 | 53 | 500 |
| Fe/Ca | ca. 100 | trace | 75 | 500 |
| Fe/Mg | 100 | 0 | 75 | 500 |
| Fe/Zn | 100 | 0 | 77 | 500 |

TABLE IX

COLOR PURITY

| | |
|---|---|
| Fe/Ca | GOOD |
| Fe/Mg | GOOD |
| Fe/Al (0.5%) | POOR |
| Fe/Al (0.7%) | POOR |
| Fe/Zr | POOR |

Various changes and modifications can be made in the products and process of the present invention without departing from the spirit and scope thereof. The various embodiments which have been disclosed herein were set forth for the purpose of illustrating the invention but were not intended to limit it.

What is claimed is:

1. A pearlescent pigment comprising micaceous particles having an adherent layer of rutile TiO₂ thereon, the pigment being free of tin deposited on the micaceous particles and containing iron and at least one of calcium, magnesium and zinc.

2. The pearlescent pigment of claim 1 containing iron and calcium oxides.

3. The pearlescent pigment of claim 1 containing iron and magnesium oxides.

4. The pearlescent pigment of claim 1 containing iron and and zinc oxides.

5. In the method of forming a rutile titanium dioxide-coated micaceous particle pearlescent pigment in which hydrous titanium dioxide is deposited on the micaceous particles followed by calcining, the improvement which comprises effecting the titanium deposit in the presence of iron and at least one of calcium, magnesium and zinc ions and in the absence of tin.

6. The method of claim 5 in which the amount of iron is about 0.125–1% and the amount of the at least one of calcium, magnesium and zinc is at least about 0.05%, based on the weight of the micaceous particles.

7. The method of claim 6 in which the amount of each of said ions is about 0.25–0.75% based on the weight of the micaceous particles.

8. The method of claim 5 in which the titanium dioxide deposition is effected by adding a titanium containing compound to an aqueous slurry containing micaceous particles, a water soluble iron compound and at least one water soluble calcium, magnesium or zinc compound.

9. The method of claim 5 in which at least one of the ions of iron, calcium, magnesium and zinc is deposited on the micaceous particles before the titanium dioxide is deposited thereon.

10. The method of claim 5 wherein said at least one ion is calcium.

11. The method of claim 5 wherein said at least one ion is magnesium.

12. The method of claim 5 wherein said at least one ion is zinc.

13. A process for the preparation of a pearlescent pigment which comprises, in sequence and in the absence of exogenous tin, treating micaceous particles with an iron compound-containing solution having a concentration, expressed as iron and based on the micaceous particles, of from about 0.125–1% by weight;

treating the micaceous particles before, simultaneously or after the iron treatment with a second metal compound-containing solution having a concentration, expressed as metal and based on the micaceous particles, of at least about 0.05% by weight, said second metal being at least one of calcium, magnesium and zinc;

coating the particles with titanium dioxide in the hydrous form by deposition from a titanium compound-containing coating bath;

removing the titanium dioxide particles from the coating bath and washing said particles to remove excess acid and impurities therefrom; and calcining said particles at a temperature in excess of 650° C. to produce a translucent coating of titanium dioxide in the rutile crystalline form thereon.

14. The process of claim 13 in which the iron compound-containing solution has a concentration, expressed as iron, of about 0.025–0.75% and the second metal compound containing solution has a concentration, expressed as metal, of about 0.25–0.75%.

15. The process of claim 13 in which the micaceous particles are simultaneously treated with the iron and second metal compound-containing solutions.

16. The process of claim 13 in which the second metal is calcium.

17. The process of claim 13 in which the second metal is magnesium.

18. The process of claim 13 in which the second metal is zinc.

* * * * *